(12) United States Patent
Alfonso et al.

(10) Patent No.: US 7,651,646 B2
(45) Date of Patent: *Jan. 26, 2010

(54) PARTICLE FILLED RESINOUS PRODUCT OF IMPROVED APPEARANCE

(75) Inventors: Jorge Alfonso, Pasadena, MD (US); Leonard R. Elbon, Glen Burnie, MD (US); Donald Wayne Finnerty, Pasadena, MD (US)

(73) Assignee: The Diller Corporation, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/423,360

(22) Filed: Jun. 9, 2006
(Under 37 CFR 1.47)

(65) Prior Publication Data

US 2007/0129494 A1 Jun. 7, 2007

Related U.S. Application Data

(60) Continuation of application No. 09/527,291, filed on Mar. 17, 2000, now Pat. No. 7,081,220, which is a division of application No. 09/031,923, filed on Feb. 27, 1998, now Pat. No. 6,040,045.

(51) Int. Cl.
 *B29B 9/00* (2006.01)
(52) U.S. Cl. .......................... 264/73; 264/75; 264/140; 264/141
(58) Field of Classification Search ....................... None
See application file for complete search history.

(56) References Cited

U.S. PATENT DOCUMENTS 7,081,220 B1 * 7/2006 Alfonso et al. ................. 264/73

* cited by examiner

*Primary Examiner*—Mary Lynn F Theisen
(74) *Attorney, Agent, or Firm*—Dinsmore & Shohl LLP

(57) ABSTRACT

Plastic surfacing material of the FOUNTAINHEAD® type having a bold and aesthetically pleasing appearance is achieved by the use TFR pigments, the latter of which are manufactured by orienting reflective flake pigments in a plastic substrate and grinding the substrate to a particulate material.

6 Claims, No Drawings

PARTICLE FILLED RESINOUS PRODUCT OF IMPROVED APPEARANCE

This application claims the benefit of U.S. Provisional Application No. 60/038,544, filed on Feb. 28, 1997.

FIELD OF INVENTION

The present invention relates to improvements in decorative products formed of particle filled resins, commonly available in the marketplace under the names of CORIAN™ (Dupont) and FOUNTAINHEAD® (International Paper).

BACKGROUND

Products of the general character of the aforementioned CORIAN™ and FOUNTAINHEAD® products have been long known and are commonly available such as for use as kitchen and bathroom surfaces. Broadly speaking, these materials are formed of particle filled resins, the most common resins being polyesters and acrylates, and the fillers ranging widely, often used to give particular visual effects to the product. Many prior patents directed to these types of products exist, bearing titles such as "Resinous Product Simulating Onyx" in Schaefer U.S. Pat. No. 3,396,067; "Filled Polymethylmethacrylate Article and Process for its Manufacture" in Duggins et al U.S. Pat. No. 3,827,933; "Process for the Production of Marbleized Reinforced Polyacrylic Compositions" in Miller U.S. Pat. No. 3,663,493; "Thick, Cured Polymethylmethacrylate Article and Process for its Preparation" in Slocum Re. 27,093; "Reinforced Resin Compositions" in Rees et al U.S. Pat. No. 3,789,051; "Use of Alumina Trihydrate in a Polymethylmethacrylate Article" in Duggins U.S. Pat. No. 3,847,865, these being just a few examples of the many, many U.S. patents which exist in this field.

The aforementioned products have achieved remarkable commercial success, especially for tabletops and kitchen and bathroom surfaces, and are normally available in a great variety of appearances. For example, the aforementioned FOUNTAINHEAD® product is a solid, non-porous surfacing material available in a variety of colors and patterns which run throughout its thickness, giving it a soft, deep translucent and natural feeling of warmth. Yet this material is tough and resists heat, stains, mildew and impact, and can be easily repaired if damaged. The FOUNTAINHEAD® product line includes soft, neutral solid colors and "granite-like" patterns, as well as grays, black and whites.

Commonly used pigments in these products are composed of small particles of inorganic compounds, often metallic oxides, which are roughly spherical in shape. Other pigments are also sometimes used, as well as fillers and larger pieces of colored material to provide different visual effects. Alumina trihydrate (ATH) is often included as a filler for its particular fire-retardant properties.

Pearlescent buttons have been made for many years by injection molding or the like, using pearlescent and iridescent pigments, and such pigments have been used in other fields as well, such as in the manufacture of bowling balls.

Commercially available pigments of this type, called by various names such as opalescent, pearlescent, iridescent, interference and thermochromatic pigments, are used to give the products in which they are used a sheen, reflectivity and three dimensional look, and it would be desirable to be able to provide such an appearance in surfacing materials of the type with which the present invention is concerned, as broadly described above. However, until the present time this has not been successful for a variety of reasons, including the fact that many of such pigments, here referred to simply as "pearlescent", become buried in the body of the product so that their light reflecting properties become lost.

In addition, these commonly available pearlescent pigments are shear sensitive so that their pearlescent effect is killed by the addition of common opacifiers used in these products, such as titanium dioxide and ATH.

SUMMARY OF INVENTION

It is, accordingly, an object of the present invention to overcome deficiencies in the prior art, such as indicated above.

It is another object of the invention to provide a new "pearlescent" additive which, when used in the manufacture of aforementioned products of the FOUNTAINHEAD® type, produce new, bold and aesthetically pleasing appearances.

It is a further object of the present invention to provide such a surfacing material of the FOUNTAINHEAD® type which incorporates such improved "pearlescent" particles, and which consequently have such a new, bold and aesthetically pleasing appearance.

Yet another object of the present invention is to provide a method of making such improved pearlescent particles, hereinafter sometimes called translucent fire retardant particles (TFRs).

And still a further object of the present invention is to provide a process using such TFR particles to produce a number of new, visually aesthetically pleasing patterns in the FOUNTAINHEAD®-type products.

These and other objects are achieved in accordance with the present invention by providing appropriate TFR particles each containing oriented pearlescent flakes. The TFR particles are then used in the manufacture of the final FOUNTAINHEAD®-type products.

DETAILED DESCRIPTION OF EMBODIMENTS

A preferred process for making the TFR particles involves mixing conventional plastic, preferably polyester although acrylics and other polymers can also be used, together with conventional fillers, commonly used in the manufacture of FOUNTAINHEAD® and CORIAN™ type products, together with a particular commercially available pigment which comprises small mica flakes of about 5-50 μm having angstrom thickness metal oxide coatings on their surfaces, often $TiO_2$, which coated mica flakes are commonly used to make pearlescent products including buttons and bowling balls. After the coated mica flakes, optional fillers, optional conventional pigments for color, and uncured plastic are mixed together to form the TFR composition, curing (preferably complete curing) of the plastic is carried out in such a way as to cause the mica flakes to become oriented in particular orientation patterns. One preferred way of accomplishing this orientation is to cast the mixture of flakes and plastic, with or without fillers and other pigments, onto a flat plate or belt and heat the mixture differentially, e.g. from the bottom through a metal conveyor belt on which the composition is cast, so as to cause the flakes to become oriented in generally oval patterns.

Regardless of how orientation of the flakes is carried out, the cured product, e.g. in solid ribbon form, is then ground to different particle sizes, to produce a granular TFR product, which translucent fire retardant particles are themselves used as an additive in the manufacture of the final FOUNTAINHEAD® type products. A key factor in obtaining the desired final product is the nature of the TFRs which contain the coated mica flakes become locally oriented in the same direction, as use of the original coated mica flakes alone in the manufacture of the final product, without the intermediate manufacture of the TFRs will not give the desired results; the reason why flakes per se and alone do not produce a good final product is that in commercial production of the final product, the flakes do not orient in such a way as to give the desired appearance.

A wide variety of product appearances can be provided according to the present invention: for example, using appropriate brown pigments, products having the appearance of burl wood are made which cannot be made according to the prior art.

In the manufacture of the TFRs, it is desirable to grind the pearlescent flake-containing solidified ribbon to provide TFR particles of reasonably large size, desirably on the order of at least 50 μm of minimum dimension. There is no limit on the maximum size of such TFRs, except it is preferred that they be no larger than 5 cm in their greatest dimension; their size is also limited by the thickness of the final product which is conventionally made in thicknesses of one-half and three-quarter inches. TFRs in any one final product can be provided in a variety of sizes simply by variable crushing of the cured ribbon.

In the manufacture of the final product, the TFRs in plural sizes, preferably at least two or three different sizes, are added to the conventional mix in amounts of up to 30-35% in mixes where ATH is an ingredient as is preferred, or in an amounts up to about 60% where the product is ATH-free. It is preferred that small quantities of the coated mica flake pigment also be added to the final mix, preferably in a quantity which is less than the quantity of the TFRs, e.g. up to 50% of the quantity of the TFRs, to provide a final product having a somewhat enhanced appearance. In the manufacture of the final product, the TFRs become randomly reoriented to provide the final product, which has a somewhat pearlescent appearance. However, it is preferred that the composition of the final decorative product be passed through a die to orient parallel to the plane of the resultant product whatever raw coated flakes may be present in the composition.

The final product preferably contains about 50-60% ATH, including the ATH present in the TFRs, and about 15-20% TFRs, and also preferably about 1-5% additional conventional pigment, most preferably pigment of the coated mica type. The additional pigment, preferably of the coated mica type, gives a good background for the TFR particles.

In more detail, in the manufacture of the TFRs using the aforementioned coated mica flakes, the presently preferred method is to form a first mixture of pigments, hereinafter sometimes called a holomar pigment formulation, then mix the holomar pigment formulation with resin and optional filler, e.g. ATH, and then to continuously cast the composition on a heated belt so that there is a thermal gradient. When heat is applied upwardly from the heated belt, the coated mica flakes tend to orient in generally oval shaped patterns. When the cured ribbon is thereafter ground to different particle sizes to produce the different particle sized TFRs, and these TFRs are then used in the manufacture of the final product, the pigment alignment is such that the holomar pigments of the TFRs reflect light in many different planes which shift as the frame of reference of the viewer changes.

The composition for making the TFRs can vary widely, and typically contains 30-95% (preferably 30-50%) curable resin, preferably thermosetting polyester or thermosetting acrylic syrup; 0-65% (preferably 45-65%) ATH; 0.7-50% (preferably 6-10%) holomar pigment formulation as explained below; 0-40% (preferably 3-8%) methyl methacrylate monomer; and appropriate initiator and/or catalyst, e.g. 0.2-3.5% methyl ethyl ketone peroxide and 0.01-0.1% of a 12% cobalt octoate composition. The aforementioned holomar pigment formulation is formed of 15-100% of the commercially available coated mica flakes, 0-20% black pigment, 0-20% of other standard colored pigments, 0-80% of a diluent which is a preferably a thermoplastic (non-reactive) polyester, 0-80% of reactive resin which is preferably a thermosettable polyester, and 0-5% of a wetting agent.

In the most preferred method, the aforementioned TFR composition, preferably initially without the holomar pigment formulation and catalyst which are later metered in, is well mixed such as in a kneading continuous mixer, and the final mixture is cast onto the heated belt on which the mixture is cured to a solid. The resultant solid ribbon passes to a hammer mill where it is crushed and then conveyor fed to a granulator and then to a three-roll mill with adjustable rollers so that the maximum size of the TFR particles can be controlled. The TFR particles can either be separated to sizes such as by using screens and then remixed according to what is desired, or it can be used as is without classification, preferably after removal of fines.

Some non-limitative examples of formations are given below.

A preferred composition for the manufacture of the TFR particles consists of approximately 48% ATH, approximately 44% thermosettable polyester resin, approximately 7% of the holomar pigment formulation, and approximately 1% in total of methyl methacrylate monomer, catalyst and initiator. One holomar pigment formulation for producing a sapphire color consists of about 30% of coated mica flake pigment, about 70% of thermoplastic polyester as diluent, and less than 1% of black pigment. A similar holomar formulation, but without the black pigment, produces a bronze/copper color. An olive-colored holomar formulation is formed of approximately 33% of the coated mica flakes, 18% black pigment and 48.5% non-reactive polyester as a diluent.

FOUNTAINHEAD® sheet product is made according to standard practice and standard formulation, but to which is added, in three separate runs, respectively 15% of said TFR particles, 20% of said TFR particles and 25% of said TFR particles, based on the total composition. The resultant FOUNTAINHEAD® sheet products contain respectively about 60%, 55% and 50% ATH, with the remainder in each case being predominantly the thermoset polyester with relatively minor amounts of other materials as indicated above. The TFRs can also be used in the manufacture of shaped goods.

Suitable exemplary and non-limitative pigment formulation examples, in addition to those set forth above, are set forth below:

Example 1

Copper Colored Pigment for Making TFRs

70% thermosettable polyester resin
30% copper colored coated flakes (Mearlin Super Copper 9350Z)

Example 1A

Copper Colored Additional Pigment

70% non-reactive polyester diluent
30% copper colored coated flakes (Mearlin Super Copper 9350Z)

Example 2

Bronze Colored Pigment for TFRs

70% thermosettable polyester resin
30% bronze colored coated flakes containing black pigment (Mearlin Super Bronze 9250Z)

Example 2A

Bronze Colored Additional Pigment

70% non-reactive polyester as diluent
30% Bronze color coated flakes containing black pigment (Mearlin Super Bronze 9250Z).

Example 3

Biege Colored Pigment for TFRs 66.01% thermosettable polyester resin
29.70% shiny metallic colored coated flakes (Mearlin Super Sparkle 9110S)
2.97 gold colored coated flakes (Mearlin Sparkle Gold 9212P)
1.00% wetting agent
0.30% dark brown color coated flakes (Mearlin Nu Antique Bronze 9240AB)
0.02% green pigment (Ferro Green 11-41057)

Example 3A

Biege Colored Additional Pigment 66.01% non reactive polyester as diluent
29.70% shiny metallic colored coated flakes (Mearlin Super Sparkle 9110S)
2.97% gold colored coated flakes (Mearlin Sparkle Gold 9212P)
1.00% wetting agent
0.30% dark brown color coated flakes (Mearlin Nu Antique bronze 9240AB)
0.02% green pigment (Ferro Green 11-41057)

Example 4

Dark Green Pigment for TFRs 48.50% thermosettable polyester resin
30.00% light sandy colored coated flakes with green hue (Mearlin Hi Lite Super Green 9830Z)
18.00% black pigment (carbon black)
3.50% gold colored coated flakes (Mearlin Sparkle Gold 9212P)

Example 4A

Dark Green Additional Pigment 48.50% non reactive polyester as diluent
30.00% light sandy colored coated flakes with green hue (Mearlin Hi Lite Super Green 9830Z)
18.00% black pigment (carbon black)
3.50% gold colored coated flakes (Mearlin Sparkle Gold 9212P)

The following non-limitative example is for the manufacture of the TFRs:

Example 5

48.02% ATH
44.14% thermosettable polyester resin
6.67% TFR pigment, e.g. according to examples 1, 2, 3 or 4
0.90% catalyst
0.25% methymethacrylate monomer
0.03% cobalt octoate solution (12%)

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. For example, the surfacing materials of the present invention can be made using acrylic or acrylate polymers instead of polyester polymers. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A method of making a particulate pearlescent pigment for plastic products which comprise small hard resin particles of different sizes containing pearlescent reflective flakes which are aligned in each particle with their flat surfaces generally parallel, the method comprising:
mixing a binder resin with said pearlescent reflective flakes, solidifying the binder resin in such a way as to cause alignment of the flakes with their flat surfaces generally parallel, and comminuting the resultant solidified binder resin to make said small hard particles of at least two different sizes.

2. The method of claim 1 wherein said comminuting is carried out by grinding from a large sheet in which said reflective flakes are oriented.

3. A method of making a filled hard surfacing material having an aesthetically pleasing appearance, comprising adding pearlescent pigment particulate comprising small hard resin particles of different sizes containing pearlescent reflective flakes which are aligned in each particle with their flat surfaces generally parallel to a plastic material as a matrix to form a mix, and then forming and solidifying said mix, said particulate being made by mixing a binder resin with said pearlescent reflective flakes, solidifying the binder resin in such a way as to cause alignment of the flakes with their flat surfaces generally parallel, and comminuting the resultant solidified binder resin to make said small hard particles of at least two different sizes.

4. A method according to claim 3, comprising further adding raw coated reflective flakes in an amount up to 5% and orienting said flakes substantially parallel to opposite surfaces of said surfacing material.

5. A method according to claim 4 wherein the plastic is a hard polyester or acrylic.

6. A method according to claim 3 wherein the plastic is a hard polyester or acrylic.

* * * * *